Dec. 28, 1965    W. DE HAAN ETAL    3,225,857
SAFETY HINGE AND LATCH FOR A REMOVABLE VEHICLE BODY CLOSURE
Filed Oct. 1, 1963    3 Sheets-Sheet 1

INVENTORS
Wolbert DeHaan &
BY Robert O. Vogelei

Edward E. James
ATTORNEY

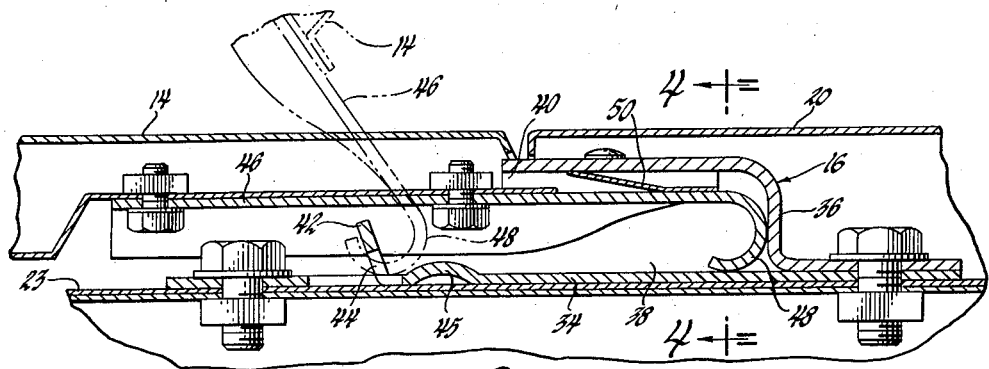

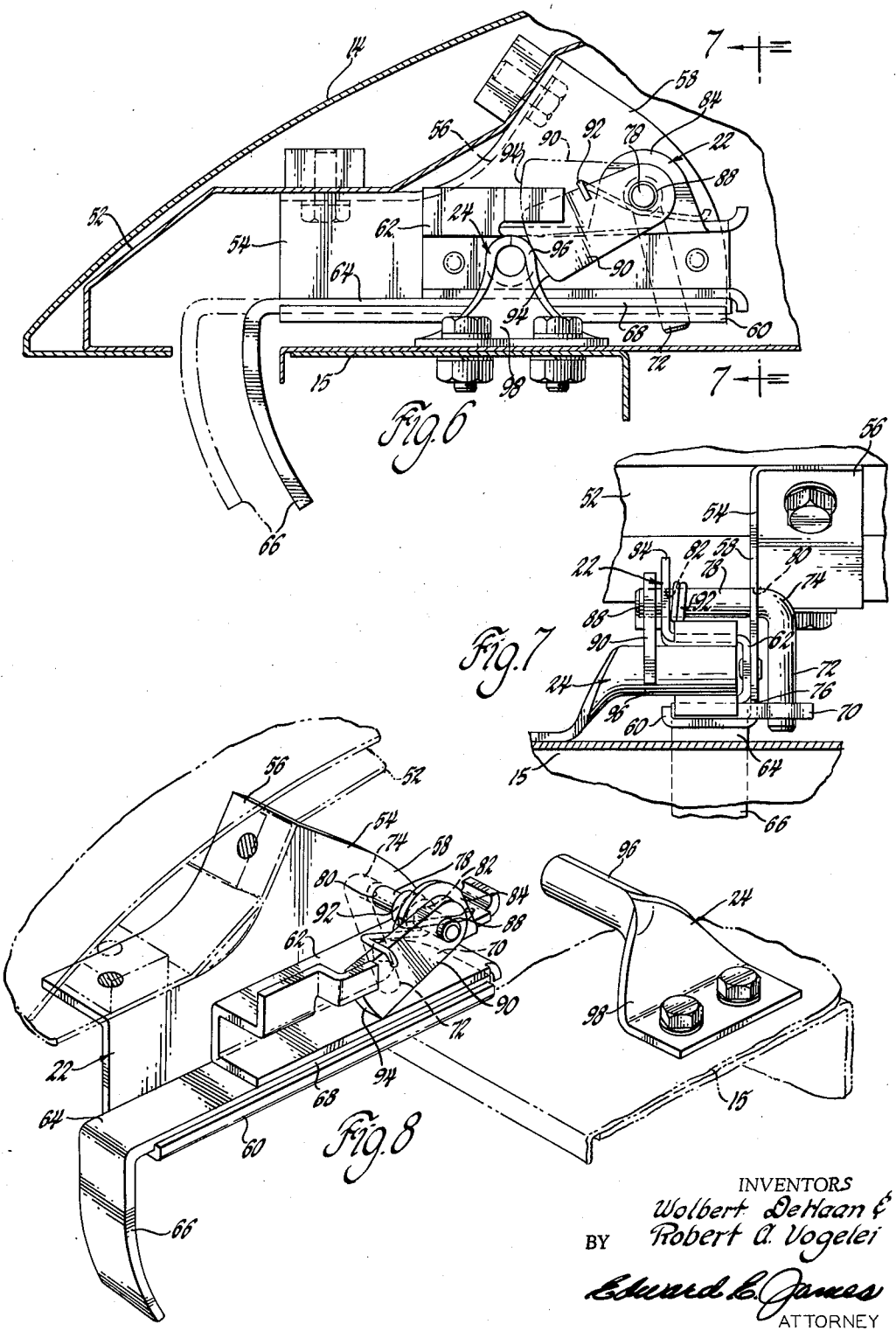

United States Patent Office 3,225,857
Patented Dec. 28, 1965

3,225,857
SAFETY HINGE AND LATCH FOR A REMOVABLE VEHICLE BODY CLOSURE
Wolbert De Haan, Farmington, and Robert A. Vogelei, Southfield, Mich., assignors to General Motors Corporation, Detroit, Mich., a corporation of Delaware
Filed Oct. 1, 1963, Ser. No. 312,997
9 Claims. (Cl. 180—69)

This invention relates generally to a hinged closure member and more particularly to a hinge and latch arrangement for the hood or closure member of a vehicle body defined engine or luggage compartment.

The compartment closing members of modern vehicles have generally been mounted on the vehicle body for limited swinging translation by gooseneck hinges or by quadrilateral hinge linkages. To facilitate closure opening and compartment access within the hinge defined limits, such hinges are usually provided with overcenter counterbalancing springs. Such spring biased hinges usually require a hood or closure member of somewhat greater strength and weight. Often the accumulative manufacturing tolerances of such hinges make it difficult to install and maintain the hood or closure member in proper alignment with the vehicle body opening. To insure maintenance of a front opening hood or closure member in its closed position during vehicle operation, such conventional hinges further require the use of relatively complex, heavy-duty closure latching mechanisms having both primary and secondary safety latching means.

The instant invention contemplates an improved closure mounting arrangement wherein hinge and latch means of relatively simple inexpensive design cooperate to interlock and maintain a relatively light hood or closure member in a closed safety position with respect to the vehicle body.

With regard to certain of its more specific aspects, the invention further contemplates and provides an illustrative front opening closure member with hinge and latch means of extremely simple cooperating construction, which may be easily adjusted for proper closure-to-body alignment, which permit full opening and/or easy removal of the hood or closure member to facilitate engine compartment access for service and maintenance, and which interlock the closure member in a closed safety position maintainable by the vehicle speed induced air flow to prevent upward swinging movement of the closure member.

The latch means of the illustrative embodiment is of relatively simple economical construction and cooperates with the interlocking rear hinge means to restrain the hood or closure member from swinging movement when shifted rearwardly to a hinge interlocking closed position. A spring biased pivotal bolt or take-up pawl latchably engages a striker to cam the closure member rearwardly toward its extreme closed position and to prevent forward movement of the hood or closure member to its intermediate hinge engaging position. A relatively simple latch operating means is movable through a range to unlatch and shift the hood member forwardly from its hinge interlocking position to its intermediate hinge engaging position. Upon such hinge engagement, the hood or closure member may be swung upwardly to an opened position maintainable by a prop or rod member pivotally mounted and swingable between the body and hood member to a raised hood supporting position.

The foregoing objects, advantages and features of the invention will be apparent from the following description of the illustrative embodiment having reference to the accompanying drawings, in which:

FIGURE 3 is a further enlarged fragmentary view similar to the broken away hinge illustrating portion of FIGURE 2 but sectioned longitudinally to show the interlocked closed positions of the combined hinge and hood interlocking members in full lines with the opened position of the hood secured hinge member being shown in broken lines;

FIGURE 4 is a transverse fragmentary sectional view taken substantially in the plane indicated at 4—4 of FIGURE 3 and shows the illustrative hood hinge members in their cooperating interlocked closed positions;

FIGURE 5 is a perspective view showing the cooperating hinge members in spaced disengagement either just after hood removal or just prior to hinging engagement;

FIGURE 6 is a fragmentary sectional view taken through the front portions of the closed hood and body members to show the cooperating elements of the illustrative hood latching means in side elevation, the spring-biased take-up bolt or latching pawl of an illustrative hood mounted latch mechanism being shown by full lines in latching engagement with an adjacent body mounted striker and by broken lines in hood releasing striker disengagement;

FIGURE 7 is a fragmentary sectional view taken substantially in the direction of the arrows indicated at 7—7 of FIGURE 6 and shows the illustrative latching mechanism and the bolt engaged striker in rear elevation; and FIGURE 8 is a fragmentary prespective view showing the illustrative latch mechanism and striker in spaced relation prior to relative movement between the hood and body members, both partially shown in broken phantom lines, carrying the hood member rearwardly to its hinge interlocking, latch maintained safety position.

Figure 1:
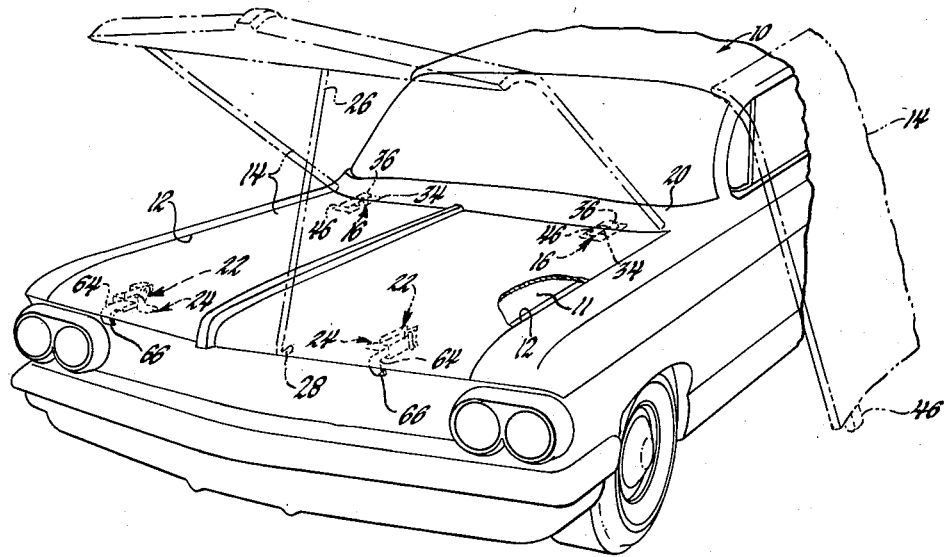
FIGURE 1 is a partial three-quarter front perspective view of a motor vehicle body having a front engine compartment and a hood member removably mounted in accordance with the invention for movement between an extreme closed position shown in full lines and opened and removed positions shown in broken lines.

Referring more particularly to FIGURE 1, the illustrated front portion of an automotive vehicle body 10 has a front engine compartment 11 accessible for service and maintenance through an upwardly disposed opening 12 formed by the adjacent exterior body panels. In accordance with the invention, a hood or closure member 14 of relatively light construction is normally maintained in an extreme compartment closing safety position shown in full lines in FIGURES 1 and 3 by cooperating latch means engageable between the front of the hood member and a transverse front body member 15 and interlocking hinges 16 spaced transversely of and extending between the rear of the hood member and the transverse fire wall 18 adjacent the front windshield mounting cowl 20 of the vehicle body. The hood latching means of the illustrative embodiment includes two transversely spaced latch mechanisms 22 mounted on each front undercorner of the hood and two similarly spaced strikers 24 mounted on the transverse front body member 15.

Figure 2:
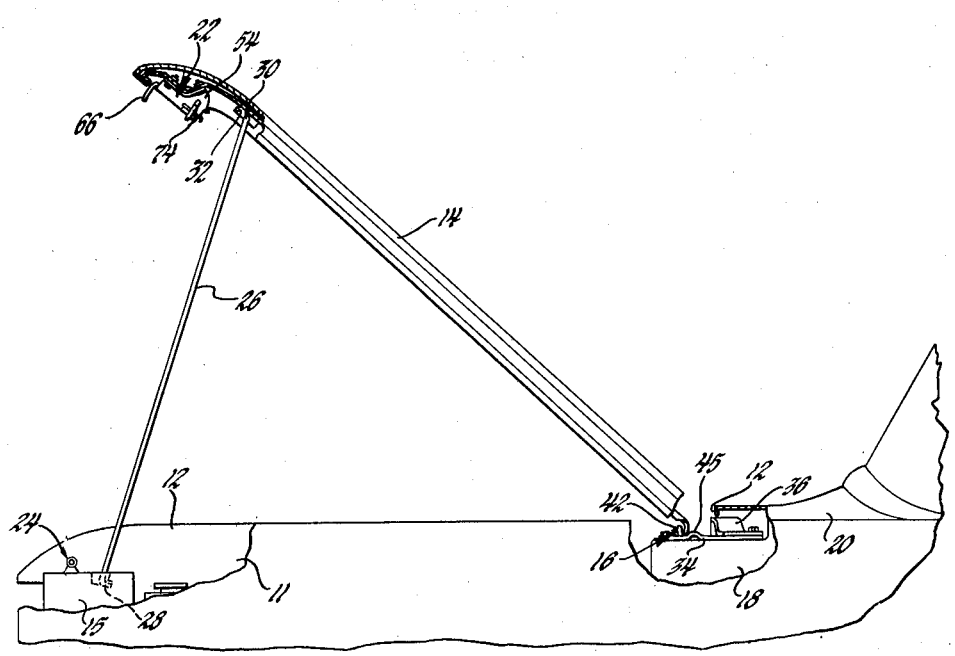
FIGURE 2 is an enlarged fragmentary side elevational view of the upper front portion of the illustrative vehicle body and of the hood in its raised prop-maintained opened position with portions of the body broken away to show the cooperating hood hinge and latch means of the invention.

Upon selective disengagement of the hood latching means, the hood is shiftable forwardly through a limited range permitted by the hood hinging structures to an intermediate hinge engaging position; the hood normally remaining in compartment closing guided contact with the vehicle body during such forward movement. Upon reaching this intermediate closed position, the cooperating members of the hinge structures are pivotally engaged to permit upward swinging movement of the hood to an opened position shown in phantom broken lines in FIGURES 1 and 3 and in full lines in FIGURE 2. The hood is maintainable in the opened position shown by a prop or support rod member 26. This support rod may be pivotally mounted at 28 on the transverse body member 15 and is swingable to a raised position wherein a laterally bent upper end 30 of the rod is insertable into a retaining slot 32 formed in the forward understructure of the hood member.

The spaced interlocking hinges 16 are preferably of opposite hand. As shown in FIGURES 2–5, each comprises a body mounted bracket including a hinge plate 34 and an interlocking housing member 36 suitably secured together on a horizontally formed fire wall shoulder 23. A hinge piloting and interlocking recess or chamber 38 of rearwardly tapered cross-section is formed between the housing member 36 and the adjacent rear portion of each hinge plate 34 and opens at 40 toward the front of the vehicle. The forward portion of each hinge plate is perforated to provide an upstanding tab 42 forming a transversely extending hinge or pivot bar 44 spaced forwardly of the open end of the housing chamber 38. These hinge bars may be coaxially aligned laterally of the body by simple mounting adjustment of the plate and housing members on the fire wall shoulders. Each hinge plate may be embossed as shown intermediate the adjacent housing member and hinge tab to form a transverse boss 45 having a convex upper surface slightly spaced from and parallel to the adjacent pivotal hinge bar 44.

An open hook or J-shaped hinge member 46 is suitably secured to and projects rearwardly from each rear undercorner of the hood member. The projecting hook shaped hinge portions 48 of these members are engageable with the adjacent pivotal hinge bars 44 by linear movement of the hood forwardly to its intermediate closed position for subsequent hood swinging movement. These projecting hinge portions are insertable within the adjacent housing members by linear rearward movement of the hood. As best seen in FIGURES 4 and 5, the projecting hinge portions 48 of the illustrative hinge members are tapered rearwardly for mating, wedging engagement with the side walls of their respective interlocking housing members. Rearwardly inclined and laterally bowed leaf springs 50 are secured to the upper portion of each housing member 36 within its hinge receiving chamber 38. Upon linear movement of the hood member rearwardly to its extreme closed position, these springs slidably engage and resiliently bias the projecting hook shaped portions of the adjacent hinge members into rattle-free engagement with the adjacent hinge plate 34. The resultant interlocking cooperation between the projecting hinge portions and the housings 36 prevents swinging movement and/or removal of the hood relative to the otherwise disengaged hinge members.

During hinged hood swinging movement, the hooked portions of the hinge members 46 each thrustably and rotatably engage the convex upper surface of the adjacent hinge plate boss 45. Such engagement normally tends to prevent the weight of the inclined open hood from disengaging these hooked hinge members rearwardly from the adjacent apertured hinge tabs 42. During forward or rearward linear movement of the closed hood, this boss cams the hook portion of the hinge member 46 slightly upwardly just prior to reaching its hinge engaging or interlocking positions. When this occurs, the hinge members 34 and 46 are in an intermediate disengaged position permitting the hood to be removed from the vehicle body to provide full access to the engine compartment 11. Similar hood removing hinge disengagement may be effected by moving the hood rearwardly from a slightly inclined raised position thus preventing insertion of the projecting hinge members 46 into the hinge interlocking housings. While work is being performed on the engine, the removed hood may be temporarily stored by leaning it against the side of the vehicle body as shown in broken lines in FIGURE 1. In this leaning position, the projecting ends of the hook shaped hinge members 46 serve as hood supporting stools.

The transversely spaced hood latch mechanisms 22 are of similar construction but are preferably of opposite hand. In the drawings, only the right hand hood latching mechanism of the vehicle shown in FIGURE 1 is shown in elevational and perspective detail in FIGURES 6–8. Each latch mechanism 22 includes a hood mounted bracket 54 having an upper flange 56 suitably secured to the hood underframe 52 as shown. An intermediate vertically depending portion 58 of each bracket terminates in a lower flange 60 forming a shallow channel parallel to hood movement between its hinge engaging and interlocking positions. A flanged striker receiving channel member 62 is secured to the vertical portion of each bracket in slightly spaced parallel relation above the channel lower flange and cooperates therewith to reciprocably and slidably mount a latch operating member 64.

The latch operating member has a depending front handle portion 66 angled from a flat rearwardly extending slide portion 68. The rear end of this slide portion has a laterally extending arm 70. Upon forward latch disengaging movement of the member 64, the arm 70 sequentially engages a depending arm 72 of a pivotal bolt mounting lever 74 and a limit shoulder 76 formed by notching the bracket adjacent the lower flange 60. An angled pivot portion 78 of the bolt mounting lever 74 is journaled at 80 and 82, respectively, in the vertical bracket portion 58 and in a laterally spaced parallel flange 84 extending upwardly from the striker receiving channel member 62. A bolt arm or pawl 90 is nonrotatably secured at 88 to the angled pivot portion 78 of lever 74 outwardly of the flange 84. This bolt arm is normally biased by a torsion spring 92 mounted as shown toward a downwardly and forwardly inclined position accommodating one-way relative movement of the striker 16 to a fully latched position maintainable by a striker camming end surface 94 formed on the end of the bolt arm distal from the pivotal shaft portion of lever 74.

The transversely spaced body mounted strikers 24 are interchangeable and suitably formed to provide each with a cylindrical striker portion 96 and a depending mounting flange 98. These mounting flanges are adjustably secured to the transverse body member 15 as shown and angled upwardly to support their respective striker portions so that they each project laterally outwardly of the vehicle in spaced parallel relation above the transverse body member and normal to the bracket supported, inwardly facing channel member 62 of the adjacent latch mechanism. Upon linear movement of the hood toward its extreme hinge interlocking closed position, the cylindrical striker portions are slidably received between the oppositely flared rear ends and side walls of the adjacent channel member 62. During such relative movement of the hood mounted channel members, each striker cams the bolt arm 90 upwardly against the biasing action of the spring 92. Such striker accommodating deflection of the bolt arm continues until the hood approaches its extreme hinge interlocking closed position. Upon reaching this proximate hood closed position, each bolt arm is again spring biased downwardly into take-up camming, latching engagement with the cylindrical portion of the adjacent striker.

Forward actuation of each latch operating member 64 from its retracted position to its latch disengaging position, shown respectively in full lines and broken lines in FIGURE 6, causes the laterally extending arm thereon to engage the adjacent depending lever 74. The resultant movement imparted to the lever 74 swings the bolt arm upwardly to its striker disengaging upper position shown in broken lines. Simultaneously with such striker disengagement, the arm 70 of the operating member engages the notch formed limit shoulder 76 on the bracket member. Further forward actuating movement of each operating member 64 is thus transmitted directly through the adjacent latch mounting bracket and causes the hood to be shifted forwardly until hinge engagement occurs upon reaching its intermediate closed position. After such hinge engagement, the hood may be swung to and beyond its prop maintainable opened position.

From the foregoing description of a single illustrative embodiment, it will be seen that the invention provides an improved closure hinging and latching arrangement for a vehicle body closure member having relatively simple, inexpensive, easily fabricated and assembled components and capable of fulfilling the several stated objects and advantages. It will be further apparent to those skilled in the art that various modifications and changes might be made in and from the disclosed embodiment without departing from the spirit and scope of the invention as defined in the following claims.

We claim:

1. In combination with a vehicle body member having a compartment opening,
- a closure member for said body opening,
- hinge means for mounting said closure member on said body member for hinged swinging movement between an opened position and a compartment closing hinged position and for linear movement between said hinged position and an extreme closed position, said hinge means being disengageable by limited linear movement between said members to permit removal of the closure member from the vehicle body member,
- and cooperating means associated with said hinge means and normally engageable therebetween to prevent said swinging movement of the closure member upon movement in a hinge disengaging direction from said hinged position to said extreme closed position.

2. In the combination set forth in claim 1,
- latch means mounted on said members remotely from said hinge means and normally engageable to prevent both linear and swinging movement of the closure member when in its extreme closed position,
- and latch operating means including a member shiftable through a range to disengage said latch means and to engage and actuate said closure member to its compartment closing hinged position thereby engaging said hinge means for subsequent closure opening swinging movement.

3. In combination with a vehicle body member having a compartment opening,
- a body closure member for said opening,
- means for hinging said closure member on said vehicle body member adjacent one side of the compartment opening, said hinging means including
- a first pair of hinge members secured to one of said body members and providing coaxially spaced hinge pivots,
- a second pair of hinge members spacedly secured to the adjacent one side of the other of said body members and having projecting hinge portions engageable with said hinge pivots for hinged swinging movement of the closure member between an opened position and a compartment closing hinged position,
- said hinge members being disengageable by limited translational movement therebetween to permit removal of the closure member from the vehicle body member,
- and means mounted on said one body member and spaced from said hinge pivots and engageable with the projecting portions of said second hinge members to prevent swinging movement and removal of the closure member upon translational movement in a hinge disengaging direction from said compartment closing hinged position to an extreme closed position.

4. The combination set forth in claim 3, further including
- cooperating latch means mounted on said body and closure members oppositely of said hinge means and normally engageable to prevent both linear and swinging movement of the closure member when in its extreme closed position,
- and latch operating means including a member reciprocably mounted and shiftable through a range to disengage said latch means and to engage and actuate said closure member to its compartment closing hinged position.

5. In the combination set forth in claim 3,
- cooperating latch means mounted on said body members oppositely of said hinge means and normally engageable to prevent both linear and swinging movement of the closure member when in its extreme closed position,
- said latch means including a striker mounted on one of said body members and having a projecting portion normal to the linear movement of the closure member to its extreme closed position,
- a latch bolt pivotally journaled on the other of said body members swingable to engage said striker to prevent linear movement of the closure member from its extreme closed position,
- and latch operating means including a member mounted by one of said body members for movement through a range to disengage said latch bolt from said striker and to engage and actuate said closure member to its compartment closing hinged position.

6. In combination with a vehicle body member having a horizontally disposed upwardly facing compartment opening,
- a closure member for said opening,
- hinge means for mounting said closure member on said body member including
- a first pair of hinge members spacedly secured to said body member adjacent one side of the compartment opening and formed to provide upstanding coaxially aligned hinge pivots,
- a second pair of hinge members spacedly secured to the adjacent side of said closure member and having hooked hinge portions projecting therefrom and engageable with the upstanding aligned pivots of said first hinge members for hinged upward swinging movement of the closure member between an opened position and a compartment closing hinged position,
- said first and second hinge members being disengageable by limited linear movement therebetween to permit removal of the closure member from the vehicle body member,
- and housing means spaced from said first hinge members and adapted to receive and normally engageable with the hooked hinge portions of said second hinge members to prevent swinging movement and removal of the closure member upon substantially horizontal linear movement in a hinge disengaging direction from its compartment closing hinged position to an extreme closed position.

7. The combination set forth in claim 6, further including
- cooperating latch means mounted on said body and closure members oppositely of said hinge means and normally engageable to prevent both linear and swinging movement of the closure member when in its extreme closed position, said latch means including
- a striker mounted on one of the body members and having a horizontal projecting portion normal to the movement of the closure member to its extreme closed position,
- a latch mounting bracket secured to the other of said body members and slidably receiving the projecting portion of said striker upon movement of the closure member to its extreme closed position,
- a latching lever pivotally journaled by said latch mounting bracket for swinging movement about a horizontal axis normal to and spaced from said striker receiving movement, said latching lever having a bolt arm engageable with said striker to prevent linear movement of the closure member from its extreme closed position and an operating arm engageable to swing said bolt arm out of striker engagement, spring means torsionally biasing said latching lever toward engagement with said striker and accommodating relative movement of said striker to its latched position upon movement of the closure member to its extreme closed position, and latch operating means including a member reciprocably mounted by said latch mounting bracket and having a lateral projection engageable with the operating arm of said latching lever and shiftable through a range to disengage said latch bolt arm from said striker and to engage and actuate said closure member to its compartment closing hinged position.

8. A combined hood hinge and latch arrangement for a vehicle body member having an upwardly disposed compartment opening and a hood member for closing said body opening, means for hinging said hood member on said body member adjacent one side of the compartment opening, said means including a first pair of hinge members projecting from one of said body and hood members, a second pair of hinge members projecting from the other of said body and hood members, said hinge members being engageable for hinged swinging movement of the hood member between an opened position and a compartment closing hinged position and disengageable to permit removal of the hood member from the vehicle body member, and interlocking means interengageable between said projecting hinge members to prevent swinging movement and removal of the hood member upon linear movement in a hinge disengaging direction from its compartment closing hinged position to an extreme closed position, cooperating latch means mounted on said body and hood members oppositely of said hinge means and engageable to prevent both linear and swinging movement of the hood member when in its extreme closed position, and latch operating means including a member mounted on one of said body and hood members for movement through a range sequentially disengaging said latch means and actuating said hood member to its compartment closing hinged position.

9. A safety hood hinge and latch arrangement for a vehicle body member having a front compartment opening, a hood member for closing said body opening, means for hinging said hood member on said vehicle body member adjacent the rear of the compartment opening, said hinging means including a pair of coaxially spaced hinge pivots secured to said body member adjacent the rear of said opening, a pair of projecting hinge members mounted adjacent the rear of said hood member and engageable with said pivots for hinged front swinging movement of the hood member between opened and closed positions and normally disengageable from said pivots by limited linear rearward movement of the hood member to permit removal of the opened hood member from the vehicle body member, means on said body member spaced from said pivots and engageable with said projecting hinge members to prevent swinging movement and removal of the hood member upon linear movement shifting the closed hood member to an extreme rearward position, and cooperating latch means mounted on said body and hood members oppositely of said hinge means and normally engageable to prevent both linear and swinging movement of the closure member when in its extreme rearward position, said latch means including a striker mounted on one of said body and hood members and having a projecting portion normal to the linear movement of the hood member to its extreme rearward position, a latch bolt pivitally journaled on the other of said body and hood members and swingable to engage said striker to prevent linear movement of the hood member forwardly from its extreme rearward position, and latch operating means including a member mounted by one of said body and hood members for movement through a range to disengage said latch bolt from said striker and to engage and actuate said closure member forwardly to its compartment closing hinged position.

References Cited by the Examiner
UNITED STATES PATENTS

| | | | |
|---|---|---|---|
| 971,313 | 9/1910 | Sarchett | 16—172 |
| 2,130,186 | 9/1938 | Jacobs | 217—60 |
| 2,188,335 | 1/1940 | Claud-Mantle. | |
| 2,288,171 | 6/1942 | Robinson | 292—221 |
| 2,602,956 | 7/1952 | Reynolds | 16—172 |
| 2,763,505 | 9/1956 | Krause. | |

FOREIGN PATENTS

| | | |
|---|---|---|
| 622,046 | 4/1949 | Great Britain. |
| 1,065,436 | 1/1954 | France. |

BENJAMIN HERSH, *Primary Examiner.*

A. HARRY LEVY, *Examiner.*